United States Patent [19]

Karlsson et al.

[11] 3,989,130
[45] Nov. 2, 1976

[54] POSITIONING DEVICE

[75] Inventors: Kent Ingemar Karlsson, Saltsjobaden; Bengt Arvid Westerlund, Nacka, both of Sweden

[73] Assignee: Atlas Copco Aktiebolag, Nacka, Sweden

[22] Filed: Aug. 26, 1974

[21] Appl. No.: 500,709

[30] Foreign Application Priority Data
Aug. 31, 1973 Sweden............................ 73118721

[52] U.S. Cl................................. 192/143; 192/149; 235/48
[51] Int. Cl.².......................................... F16D 11/04
[58] Field of Search.................... 192/143, 138, 149; 235/48

[56] References Cited
UNITED STATES PATENTS

| | | | |
|---|---|---|---|
| 2,860,751 | 11/1958 | Seigle.................................. | 192/143 |
| 3,039,579 | 6/1962 | Royle et al........................... | 192/143 |
| 3,361,034 | 2/1968 | Rothrock............................. | 192/143 |

Primary Examiner—Samuel Scott
Assistant Examiner—Randall Heald
Attorney, Agent, or Firm—Flynn & Frishauf

[57] ABSTRACT

A positioning device has a pneumatic motor for longitudinally translating an arm. Four bars are parallel with the arm and form three guideways along which stopping devices can be lockable in desired positions. The stopping devices have heads that are selectively activatable into positions to form abutments for a head of the arm in order to define stop positions for the arm when the arm is moved by the motor that stalls when the arm is stopped. A shock absorber provides for a gentle stopping of the arm and its distance of operation prior to a stop position varies with the distance of displacement of the arm.

14 Claims, 7 Drawing Figures

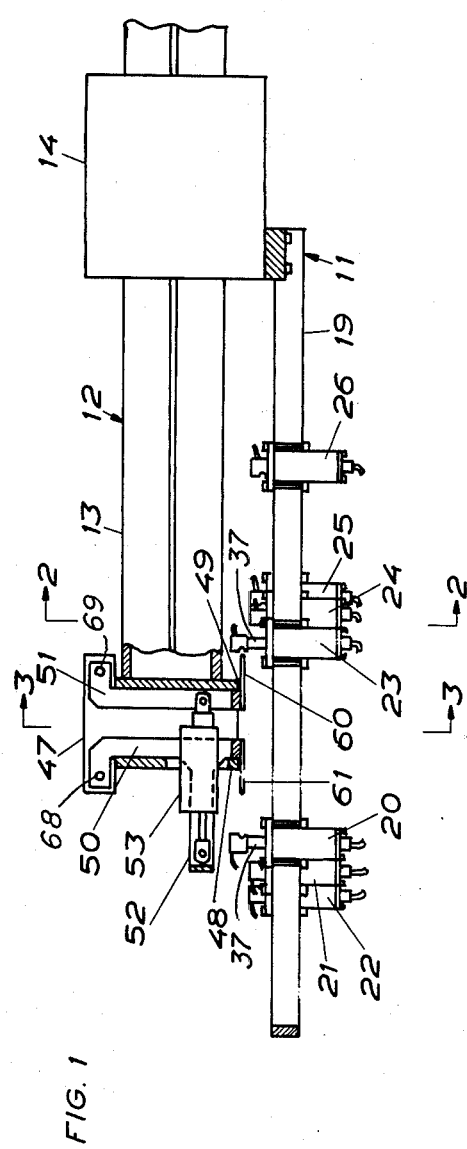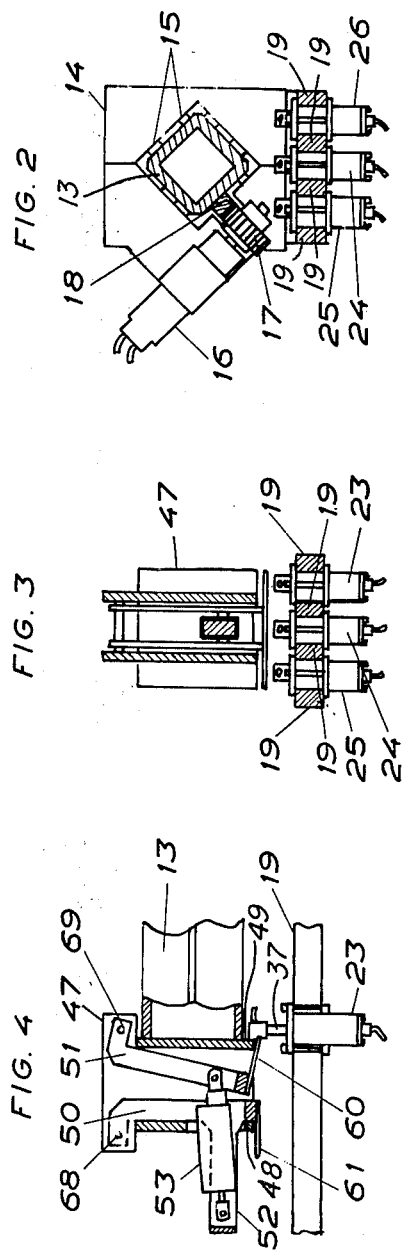

POSITIONING DEVICE

This invention relates to a positioning device comprising a first and a second main part which are translatable relative to each other along a linear path by means of a motor and arrestable in preselected various relative positions.

Such positioning devices are highly demanded, e.g. for carrying out the automating of various machining operations such as the drilling of holes in a workpiece and the machining of threads in the holes. Usually, at first the workpiece must be clamped and then displaced to various positions and possibly also turned. Advantageously, the clamping and displacement can be carried out pneumatically and all the operations can be controlled by a pneumatic peforated-tape reader, e.g. a reader of the kind that is described in U.S. Pat. No. 3,745,311. It is important that the positioning is fast and very accurate and that it is possible to pre-select positions that are very close to each other.

SUMMARY OF THE INVENTION

According to the invention there is provided a positioning device comprising a first and a second main part which are translatable relative to each other along a linear path, first and second guide means on said first main part and parallel with said linear path, a first stop device slidable along said first guide means and lockable in various positions thereto, a second stop device slidable along said second guide means and lockable in various positions thereto, said stop devices having stop members, said stop members having inactive positions for permitting free translation between said main parts and being selectively activatable into positions for engagement with a stop means on said main part so as to limit relative movement between the main parts in one direction, and a pressure fluid motor for effecting translatory movement between the main parts until it stalls out when an activated stop member of said stop devices and said stop means on said second member abut against each other to define a pre-selected relative position between said main parts.

BRIEF DESCRIPTION OF THE DRAWINGS

FIG. 1 shows a part of a positioning device;

FIGS. 2 and 3 are cross sections taken along lines 2—2 and 3—3, respectively, in FIG. 1;

FIG. 4 shows a part of FIG. 1 with some elements in another relative position;

DETAILED DESCRIPTION

Figure 5:
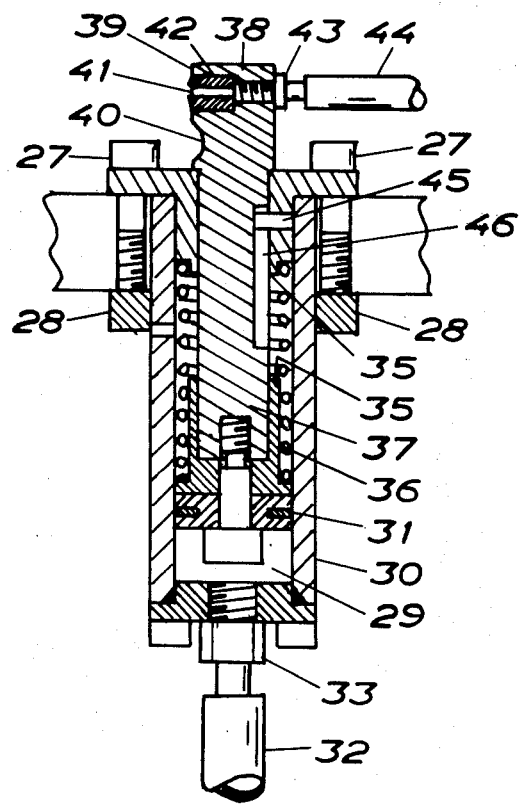
FIG. 5 shows enlarged and in a longitudinal section a detail shown in FIG. 1.

The positioning device shown in the figures comprises a stationary part that is mounted in a non-illustrated frame and generally designed by 11, and a movable part that is generally designed by 12. The movable part 12 comprises an arm in the form of a box girder 13 of square cross section, that is guided and beared in a stationary bearing box 14 by means of roller bearings 15 so that it is axially movable. The bearings 15 are not illustrated in detail. By means of a gear 17 meshing with a rack 18 on the box girder 13, a pneumatic motor 16 of the sliding vane type can displace the box girder axially in both directions. The right end of the box girder 13 is not shown and it is to be understood that a workpiece or the like which is to be positioned is affixed on the non-illustrated right end of the arm; either directly if only a linear positioning is desired or indirectly via a transverse positioning device that is carried by the arm in case an orthogonal positioning is desired. Alternatively, the part 11 that is named the stationary part can of course also be movably carried by a transverse linear positioning device of the same kind as the one illustrated. Often, a possibility of turning supplements the orthogonal positioning.

The stationary part 11 comprises a part that includes of four bars 19 (FIG. 3) that form three parallel guide ways for seven identical stopping devices 20–26. These stopping devices are lockable in desired axial positions along and between the bars 19 by means of screws 27 and yokes 28 as is best shown in FIG. 5 that shows a stopping device at a larger scale than the other Figures. A housing 30 of the stopping device forms a cylinder for a piston 31 which, when air is supplied to a pressure chamber 29 through a hose 32 and a hose fitting 33, is forced upwardly into an end position that is defined by two annular surfaces 34 and 35 that abut against each other.

Still referring to FIG. 5, a return spring 36 holds normally holds the piston 31 in its inactive position as shown in FIG. 5. The piston has a piston rod 37 and the outer end of the piston rod forms a head 38 that is a stopping element and has a flat stopping surface 39 and a transverse recess 40. In the flat surface 39, there is a hole 41 with a sealing ring 42 and a hose fitting 43. This fitting 43 is supplied with compressed air through a signal hose 44 that is supplied with compressed air at a low pressure through a non-illustrated restriction. When the hole 41 is closed off as will be described below, the pressure in the signal hose 44 will increase and indicate that the desired position is achieved. The piston rod 37 is guided by a pin 45 that slides in a groove 46 that will permit turning of the piston rod through a small angle of one or a few degrees.

As seen in FIGS. 1 and 4, at the outer end of the box girder 13 there is a head or frame 47 with two fixed stopping surfaces 48,49. When any one of the stopping devices 20,21,22 that are located to the left of the stopping surface 48 are in their activated positions, i.e. in the extended position that is shown by the stopping device 20 in FIG. 1, the stopping surface 39 (designated on FIG. 5) of this stopping device will be in position to abut against a respective part of the surface 48 which is thus common to the stopping devices 20,21,22 that are carried by parallel guideways. In the same way, the stopping surface 49 is common to the stopping devices 23,24,25,26 to the right thereof. In FIG. 4, the stopping device 23 is shown activated, i.e. with its piston rod 37 extended and its stopping surface 39 in position for abutment against the stopping surface 49.

Figure 6:
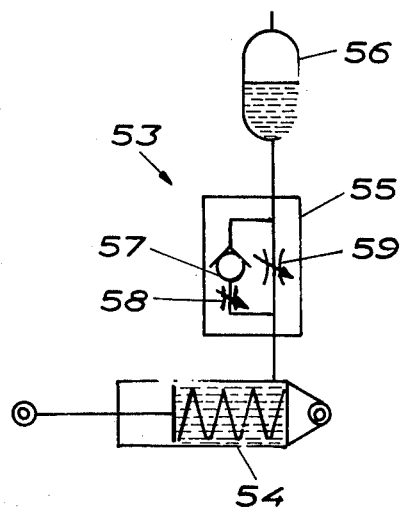
FIG. 6 shows schematically a detail in FIG. 1.

Two yokes 50,51 are suspended in the frame 47 on the outer end of the box girder 13 to swing on two transverse shafts 68,69, as shown in FIGS. 1 and 4. Between the yoke 51 and an arm 52 affixed on the yoke 50, a damping jack 53 is pivotally coupled. The damping jack 53 is schematically shown in FIG. 6 and it includes a spring 54, a one-way restrictor 55 and an oil reservoir 56. The one-way restrictor 55 comprises a one-way valve 57 and two adjustable restrictions 58,59. By means of the spring 54 the damping jack 53 braces the yokes 50,51 outwardly into their mechanically defined end positions against the frame 47 as shown in FIG. 1. When the arm 13 moves to the right in FIG. 1, a transverse plate 60 on the yoke 51 will abut against the recess 40 in the stopping device 23 that is activated, i.e. has its head 38 extended. As a result the yoke 51 swings inwardly towards the yoke 50 and the damping jack 53 is compressed. The damping force is controlled by the adjustable restriction 59 in the one-way restrictor 55. The stop position is defined by the contact between the flat stopping surface 39 of stopping device 23 and a respective part of the flat stopping surface 49 on the frame 47 as shown in FIG. 4 and causes the air motor 16 to stall at its full output torque. By means of the recess 40 in the stopping head 38, this head 38 is held in its extended position also if the pressure chamber 29 of the stopping device 23 (FIG. 5) is vented. The stopping head 38 is limitedly turnable as previously described with reference to FIG. 5 so that the flat stopping surfaces 39 and 49 will always have surface contact and the annular sealing 42 on the stopping head will always seal against the surface 49. Thus, the stopping heads have three functions, namely a) to be abutments for the respective damping yokes 50 and 51, b) to define the stopping positions of the arm 30 by means of their flat surfaces 39 that cooperate with respective parts of the surface 48 and 49, respectively, and c) to indicate the reached positions by means of the sealing rings 48 and the valving action thereof.

The three stopping devices 23,24,25 can be adjusted to define stopping positions that are as close to each other as permitted by the tolerances since these three stopping devices are displacable and activatable completely independently of each other. A plurality of stopping devices facing in the same direction can be slidable along the same guideways as examplified by the stopping devices 23 and 26.

The three stopping devices 20,21,22 to the left of the frame 47 act in the same way together with the stopping surface 48 and the yoke 50 in order to define the stop position of the arm 12 when the latter moves to the left in FIG. 1, and therefore, this is not described in detail. Since the damping jack 53 is coupled between the yokes 50,51 and the yoke 50 has a transverse plate 61 that corresponds to the transverse plate 60 of the yoke 51, the damping jack will dampen the yoke 50 in the same way as it damps the yoke 51. The restriction 58 in the one-way restrictor 55 (FIG. 6) results in that the spring 54 will need for example 0.2 seconds to brace apart the yokes 50,51 from their compressed condition. During a short movement of the arm 13, for instance from the position defined by the stopping device 20 to the position defined by the stopping device 23 in the positions these stopping devices take up in FIG. 1, the spring 54 will not have time to brace the yokes 50,51 apart into their resting positions in which they are shown in FIG. 1, and as a result, the damping distance will be shorter than normally. This is advantageous since in this case the arm 13 will not reach its normal speed. Since the damping jack 53 is common to all the stopping devices 20–26 in both directions, the damping distance and thereby the damping time will vary together with the speed of movement. If, instead, there would be a complete damping distance also after short displacements of the arm and the low speeds in connection therewith, the damping time would be longer than normal after short displacement.

Figure 7:
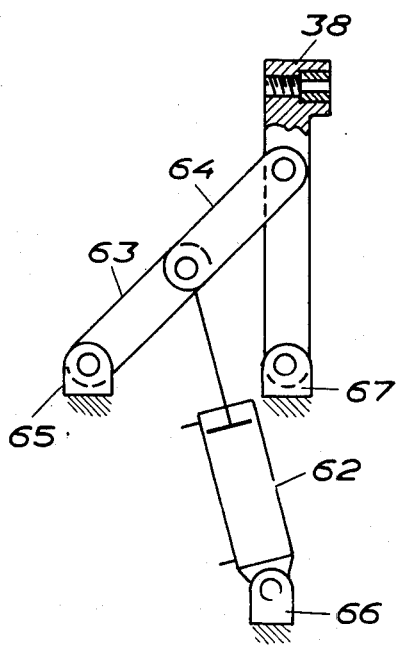
FIG. 7 shows schematically an alternative design of the detail shown in FIG. 5.

An alternative embodiment of a stopping device is shown in FIG. 7. Instead of being extended by means of a piston, the head 38 is swingably mounted and can be swung up and swung down by means of a double-acting jack 62 that is coupled to the joint between two links 63,64 to provide a toggle action. FIG. 7 is only schematical and three attachements 65,66,67 are part of the housing of the stopping device that is slidable along two the bars 19 in the same way as in the previously described embodiment. An advantage of the embodiment according to FIG. 7 is that the head 38 can be moved from its active position to its inactive position, i.e. be swung down while the air motor 16 maintains its output torque.

What we claim is:
1. A positioning device comprising:
   a first and a second main part which are translatable relative to each other along a linear path,
   stop means on said second main part,
   first and second guide means on said first main part and parallel with said linear path,
   a first stop device slidable along said first guide means and lockable in various positions thereto,
   a second stop device slidable along said second guide means and lockable in various positions thereto,
   said stop devices each including stop members having inactive positions for permitting free translation between said main parts and being selectively operable into activated positions for engagement with said stop means on said second main part so as to limit relative movement between the main parts in one direction,
   a dampening device mounted on said second main part and commonly operable with said first and second stop devices on said first main part to serve as a shock absorber prior to engagement of a stop member with one of said stop means, and
   a pressure fluid motor coupled to at least one of the main parts for effecting translatory movement between the main parts until it stalls out when an activated stop member of said stop devices and said stop means on said second main part abut against each other to define a pre-selected relative position between said main parts.
2. A positioning device according to claim 1 in which said stop members have flat surfaces for interengagement with flat surfaces that form said stop means on said second main part.
3. A positioning device according to claim 2 further comprising signal passages ending in said flat surfaces of said stop members and adapted to be closed off by said flat surfaces on said second main part.
4. A positioning device according to claim 3 in which said stop members are limitedly angularly movable in order to adjust themselves to flat contact with said flat surfaces of said second main part.
5. A positioning device comprising:
   a first and a second main part which are translatable relative to each other along a linear path,
   first and second stop means on said second main part,
   first and second guide means on said first main part and parallel with said linear path,
   a first stop device slidable along said first guide means and lockable in various positions thereto,
   a second stop device slidable along said second guide means and lockable in various positions thereto,
   a third stop device slidable along said first guide means and lockable in various positions thereto,
   a fourth stop device slidable along said second guide means and lockable in various positions thereto, said stop devices each including stop members having inactive positions for permitting free translation between said main parts, said stop members of said first and second stop devices being selectively operable into activated positions for engagement with said first stop means on said second main part so as to limit relative movement between the main parts in one direction, and said stop members of said third and fourth stop devices being selectively operable into activated positions for engagement with said second stop means on said second main part so as to limit relative movement between the main parts in the direction opposite to said one direction, a first dampening element movably mounted on said second main part and facing said first and second stop devices, a second dampening element movably mounted on said second main part and facing said third and fourth stop devices, means for biasing said first and second dampening elements against mechanically defined end positions for engagement with the respective stop devices when the latter are in their activated positions, a double acting shock absorber coupled between said first and second dampening elements, and a pressure fluid motor coupled to at least one of the main parts for effecting translatory movement between the main parts until it stalls out when an activated stop member of said stop devices and said stop means on said second main part abut against each other to define a preselected relative position between said main parts.

6. A positioning device according to claim 5 in which said first and second dampening elements comprise yokes that are mounted to swing about axes transverse to said one direction.

7. A positioning device comprising:
a first and a second main part which are translatable relative to each other along a linear path,
stop means on said second main part, said stop means having substantially flat stopping surfaces,
first and second guide means on said first main part and parallel with said linear path,
a first stop device slidable along said first guide means and lockable in various positions thereto,
a second stop device slidable along said second guide means and lockable in various positions thereto,
said stop devices each including stop members having inactive positions for permitting free translation between said main parts and being selectively operable into activated positions for engagement with said stop means on said second main part so as to limit relative movement between the main parts in one direction, said stop members each having a substantially flat surface for interengagement with a substantially flat stopping surface of said stop means on said second main part, and said stop members each having a signal passage ending in the respective substantially flat surfaces of said stop members and adapted to be closed off by said substantially flat stopping surfaces of said second main part, and
a pressure fluid motor coupled to at least one of the main parts for effecting translatory movement between the main parts until it stalls out when an activated stop member of said stop devices and said stop means on said second main part abut against each other to define a pre-selected relative position between said main parts.

8. A positioning device according to claim 7 in which said stop members are limitedly angularly movable in order to adjust themselves to flat contact with said substantially flat surfaces of said second main part.

9. A positioning device for defining relative positions between two objects which are intertranslatable along a linear path by means of pressure fluid motor, comprising:
a first main part rigidly connected to one of said two objects,
a second main part rigidly connected to the other of said two objects, said first and second main parts being translatable relative to each other in the direction of said linear path,
said first main part having rectilinear guide beams located in parallel relationship with each other and with said linear path,
stop means rigidly supported on said second main part, said stop means comprising two oppositely facing surfaces perpendicularly located relative to said linear path, and
a plurality of abutment units independently slidable along said guide beams and lockable in various positions thereto, each of said abutment units comprising a stop member which is separately shiftable between a rest position and an activated position, the stop member in said activated position constituting an abutment against which said second main part is stopped by engagement of either of said two oppositely facing surfaces therewith, thereby defining a preselected relative position between said first and second main parts upon stalling of said pressure fluid motor.

10. A positioning device according to claim 9 in which said abutment units are located in two groups on said guide beams, the abutment units of one of said groups defining relative stop positions between said main parts during relative translation of said main parts in one direction, and the abutment units of the other of said groups define relative stop positions between said main parts during relative translation of said main parts in the opposite direction.

11. A positioning device according to claim 9 in which each of said stop members has a stopping surface adapted for interengagement with either of said two oppositely facing surfaces of said stop means of said second main part.

12. A positioning device according to claim 11 in which said stop members each include a signal passage ending in said stopping surface of each of said stop members, said signal passage being adapted to be closed off by either of said oppositely facing surfaces of said stop means on said second main part.

13. A positioning device according to claim 9 including a damping device is mounted on said second main part, said damping device including means for engaging activated abutment unit stop members in advance of said stop means.

14. A positioning device according to claim 13 in which said damping device comprises two yokes swingable in opposite directions and a damping jack interconnecting said yokes.

* * * * *